(12) United States Patent
Korsch

(10) Patent No.: US 6,361,810 B1
(45) Date of Patent: Mar. 26, 2002

(54) METHOD FOR IMPROVING THE BIOLOGICAL PROPERTIES OF AQUEOUS LIQUIDS AND EDIBLE OILS AND FOR IMPROVING COMBUSTION

(75) Inventor: Ingo P. Korsch, Uberlingen (DE)

(73) Assignee: Eco Naturforschungs-und Technologie Gesellschaft mbH, Heuchellen (DE)

(*) Notice: Subject to any disclaimer, the term of this patent is extended or adjusted under 35 U.S.C. 154(b) by 0 days.

(21) Appl. No.: 09/530,059

(22) PCT Filed: Nov. 6, 1997

(86) PCT No.: PCT/EP97/06165

§ 371 Date: Jul. 27, 2000

§ 102(e) Date: Jul. 27, 2000

(87) PCT Pub. No.: WO99/21799

PCT Pub. Date: May 6, 1999

(30) Foreign Application Priority Data

Oct. 23, 1997 (DE) .......................... 197 46 930

(51) Int. Cl.[7] .............................. C02F 3/02; A23L 1/48
(52) U.S. Cl. .......................... 426/66; 426/248; 99/451; 422/186.3; 210/205
(58) Field of Search .................. 426/66, 248; 210/205; 422/186.3; 261/DIG. 80, DIG. 48; 99/451

(56) References Cited

U.S. PATENT DOCUMENTS 5,753,106 A * 5/1998 Schenk ...................... 210/96.1
5,762,655 A * 6/1998 Kief ............................ 44/309
5,858,430 A * 1/1999 Endico ........................ 426/241
6,013,297 A * 1/2000 Endico ........................ 426/335

FOREIGN PATENT DOCUMENTS

| DE | 4136949 | * | 5/1993 |
| JP | 06296823 | | 10/1994 |
| RU | 2006654 | | 1/1994 |

OTHER PUBLICATIONS

Pauline Russell, GB–Birdham, "Advances in Water Treatment," European Dairy Magazine, pp. 28–29, (1996).

* cited by examiner

Primary Examiner—Nina Bhat
(74) Attorney, Agent, or Firm—Thorp Reed & Armstrong, LLP

(57) ABSTRACT

Liquid is filtered and degerminated and exposed to a vector potential without a magnetic field, in which region oscillations are impressed onto the liquid. Thereafter, the liquid is irradiated with photons and supplied with ionized or ozonized oxygen. Finally, the liquid is brought into an electromagnetic field aligning the liquid molecules such that the oxygen is stably integrated into the molecular structure. Generally, a method and an apparatus are provided for improving the biological properties of water or aqueous liquids as well as nutrient oil, and for improving the combustion properties of liquid fuels, particularly for oxygen enrichment. By irradiating the liquid with photons, the oxygen is introduced with a solubility above the solubility of the normal liquid.

49 Claims, 2 Drawing Sheets

METHOD FOR IMPROVING THE BIOLOGICAL PROPERTIES OF AQUEOUS LIQUIDS AND EDIBLE OILS AND FOR IMPROVING COMBUSTION

DESCRIPTION

The invention relates to a method for improving the biological properties of water and of aqueous liquids as well as nutrient oil and for improving the combustion properties of liquid fuels, particularly for oxygen enrichment, and a device for carrying out said method.

Endurance and oxygen supply are directly related. If the body is short of oxygen this leads to disease and more rapid ageing. Oxygen-enriched water primarily helps sportsmen to significantly enhance their endurance in a natural manner.

Oxygen and pure water are the two most important elements for nature and the human body. This is well known to sports medicine and to top sportsmen. Without a sufficient supply of oxygen the cell functions are damaged. By the way, oxygen is also the biggest enemy to cancer cells and the lack of oxygen a well known cause for many diseases.

Nowadays, most people, very often without knowing it, suffer from a lack of oxygen due to air pollution, job-related stays in closed rooms, lack of excercise out in the open, etc. To make things worse, the oxygen content in the blood anyway decreases with continuing age. We all know that high endurance sportsmen are able to significantly enhance their oxygen supply by altitude excercise. This may now also be achieved simply by drinking oxygen-enriched water on a regular basis.

The administration of oxygen-enriched water also reduces the effects of what may be referred to as "radiation hangover" due to radiation therapy in cancer treatment. In addition, the biological properties of nutrient oils and the combustion properties of liquid fuels may be improved by oxygen enrichment.

It is an object of the present invention to provide liquids where the saturation with oxygen is definitely higher, i.e. the absorption of oxygen is maximum, as compared to the normal solubility of oxygen of the liquid.

This object is achieved by a method for improving the biological properties and combustion properties of liquids, particularly for oxygen enrichment, characterized in that oxygen is introduced into the liquid and that prior to or during the introduction of oxygen into the liquid, the liquid is irradiated with photons of a specific wavelength or several specific wavelenghts, whereby a heavily increased long lasting oxygen content of the liquid is obtained.

By irradiating the liquid with photons, molecules in the water are excited to quantum transitions which correspond to the energy of the photons or—in the case of inelastic scattering—are lower than it. Due to the quantum excitation, the oxygen absorption of the liquid is strongly enhanced and thus long lasting such that quantum transitions having a lower recombination probability are also excited.

It may also be advantageous to locate carbonic acid ($CO_2$) at or in the structures of the water molecules to a lesser but certain degree and thus transfer it to the erythrocytes, since they pass on the carbonic acid to the kidney which uses it to control the natural blood pressure.

Preferably, the single wavelength or one out of several wavelengths is 333 nanometers. This ruby wavelength is of particular benefit for increasing the oxygen solubility or absorption of the water.

Further preferably, the single wavelength or one or several wavelengths is/are in the ultra violet region, providing a germicidal effect.

Still preferably, the introduced oxygen is ionized.

Preferably, the introduced oxygen may be ionized, providing a germicidal effect. The liquid will not be poisonous by the ozonized oxygen, since the latter will be converted to (regular) molecular oxygen after some time.

Further preferably, the oxygen is introduced in the form of hydrogen peroxide where the second oxygen atom is weakly bound such that it enters the liquid as oxygen.

Further preferably, upon introducing the oxygen into the liquid, an electromagnetic field may be applied to the liquid, which field aligns the molecules such that they can stably bind the oxygen in their molecular structure.

Also preferably, the liquid may be exposed to a vector potential. Usually, a vector potential is composed of two parts, one of which contributes to the formation of a magnetic field and the other, the curl-free vector potential, does not generate a magnetic field. While the magnetic field only squeezes the wave functions, the vector potential which does not generate a magnetic field causes a distortion of the wave function, whereby energy levels are shifted with respect to each other such that the energy levels have their population changed. If the water again exits the vector potential the wave functions are again restored such that the energy levels now occupied move up again with a reduced combination probability predominating, which, prior to that, had been increased by the vector potential. Due to this re-population of electronic energy levels, the biological properties of liquids are improved.

Essentially, the invention is a very advantageous synergistic combination of energetic excitation of purified molecular structures through vector treatment and/or treatment with photons, in conjunction with or with the simultaneous introduction of oxygen.

By pretreating the purified water with vector potentials and/or photons, the water molecules or their structures are energized in the liquid phase such that they are able to adsorb or absorb the oxygen such that the oxygen content of the water is far beyond the regular intrinsic solubility of oxygen.

This oxygen, which under certain circumstances is only bound with little energy, is preferably absorbed by biological cells, in particular the blood where it is particularly transferred to the erythrocytes, this blood providing the body cells with oxygen and intensifying their energy supply through the entire body circulation.

Preferably, the vector potential the liquid is exposed to is free from magnetic fields.

In the described process where the vector potential repopulates the energy levels, it is merely the component of the vector potential without a magnetic field which is effective. The effect of the vector potential without a magnetic field, however, is superimposed by the magnetic field which aligns magnetic dipoles in the liquid molecules such that a vector potential without a magnetic field exhibits even more distinct results.

Further preferably, the liquid in the vector potential may be provided with oscillatory information.

Using this method, the biological properties of the liquid in the vector potential are further improved.

Still preferably, the oscillatory information is supplied by a modulated laser beam or several modulated laser beams where each single laser beam may be modulated with several frequencies.

Preferably, the oscillatory information is supplied by electromagnetic waves, whereby an "antenna" or several antennas or a laser beam may be employed.

Further preferably, the oscillatory information is supplied by acoustic waves, whereby a loudspeaker or several loudspeakers or piezoelectric transducers are provided with each single loudspeaker being able to radiate several frequencies.

Preferably, the oscillatory information is supplied by mechanical oscillations, whereby a piezoelectric oscillation device or several piezoelectric oscillation devices may be located in the liquid.

Preferably, the several oscillation sources will emit phase shifted signals of the same frequency, whereby the individual phase shifted signals are in the range of 0° to 180°.

This method is meant to eradicate negative oscillations which may be present, with the negative oscillations of different phases present in the liquid being cancelled by the various phase shifted signals.

Preferably, the liquid is filtered. Thus, a liquid with enhanced purity is achieved.

Further preferably, an active carbon filter will be employed. Still preferably, the active carbon filter comprises activated carbon filaments. In ordinary carbon filters or active carbon filters the carbon is available in a granulated form. This, however, blocks the passages through the filter material, which is avoided if the filter consists of carbon filaments.

Still preferably, the carbon filaments form a web or a knit fabric. This enables quite a lot of carbon filaments to be arranged within a small space.

Preferably, the web or knit fabric contains silver filaments having a germ reducing effect.

Also, the object is achieved by an apparatus for carrying out the method, said apparatus being characterized in that a liquid inlet and a liquid outlet for a flowing liquid are provided; means for introducing oxygen into the liquid is provided; and in the direction of liquid flow upstream of or at the location where oxygen is introduced, a photon source irradiating the liquid with photons of a specific wavelength or several specific wavelenghts is provided.

Preferably, means for introducing $CO_2$ is also provided.

Preferably, the photon source irradiates the liquid with photons having a wavelength of 333 nm and further preferably, the photon source irradiates the liquid with photons in the ultraviolet region.

Still preferably, the means for introducing oxygen into the liquid is adapted to introduce ionized oxygen into the liquid. Preferably, the means for introducing oxygen into the liquid is adapted to introduce ozonized oxygen into the liquid.

Further preferably, there is provided, in the direction of liquid flow downstream of the introduction of oxygen into the liquid, means for applying an electromagnetic field to the water. Preferably, one or several magnets are provided which are aligned such that a magnetic field and thus a vector potential are present in the liquid.

Further preferably, one or several toroids (toroidal coils) are provided adjacent the flow of liquid such that a vector potential without a magnetic field is created in the liquid. The magnetic field remains within the toroid while only the the vector potential without a magnetic field escapes to the outside.

Still preferably, the current flow in the toroid or in the toroids is directed such that a left-handed chirality is induced in the liquid, thus further improving the biological properties.

Preferably, a plurality of magnet elements directly adjacent to each other are provided adjacent the flow of liquid, the south and north poles of these elements mutually abutting each other such that a vector potential without a magnetic field is generated in the liquid. Due to the abutting of the south and north poles, the magnetic field is short-circuited such that only a vector potential without a magnetic field is formed outside the magnets.

Preferably, one modulatable laser or several modulatable lasers are provided, where the beam or the beams penetrates/penetrate the liquid in the region of the vector potential.

Further preferably, one antenna or several antennas are provided, where the electromagnetic radiation penetrates the liquid in the region of the vector potential.

Preferably, one or several loudspeakers are provided, where the sound radiation penetrates the liquid in the region of the vector potential.

Preferably, one or several piezoelectric oscillation transducers are arranged in the liquid in the region of the vector potential, causing mechanical oscillations in the liquid.

Preferably, a filter is provided in the flow of liquid.

Further preferably, the filter is an active carbon filter.

Still preferably, the active carbon filter comprises activated carbon filaments.

Preferably, the carbon filaments form a web or a knit fabric, and still preferably, the web or knit fabric contains silver filaments.

In the following, the invention will be set forth in a particularly preferred embodiment, where:

BRIEF DESCRIPTION OF THE DRAWINGS

Referring to FIG. 1, water flows through a filter consisting of knitted activated carbon filaments with silver filaments knitted into it. The web or knit fabric combines quite a lot of carbon filaments in the smallest possible space, resulting in an outstanding filter effect while the silver filaments degerminate the water. Next, the water is brought into a vector potential without a magnetic field, where the water is supplied with oscillation information.

Referring to FIG. 2, an arrangement of two toroids 2 is shown with their current filaments 9 extending such that a vector potential without a magnetic field having a left-handed chirality is created between the toroids.

Referring to FIG. 3, a magnetic sheet 4 carrying magnet elements 3 closely adjacent to each other and with their north and south poles closely abutting each other is provided in a jacket 5. The magnetic field of the individual magnetic elements is perpendicular to the cylinder jacket. Through an inlet 8 and an outlet 7 the water is fed across the vector potential without a magnetic field by a pipe 6. In the region of the vector potential in the water, there is an oscillation device 1.

Figure 1:
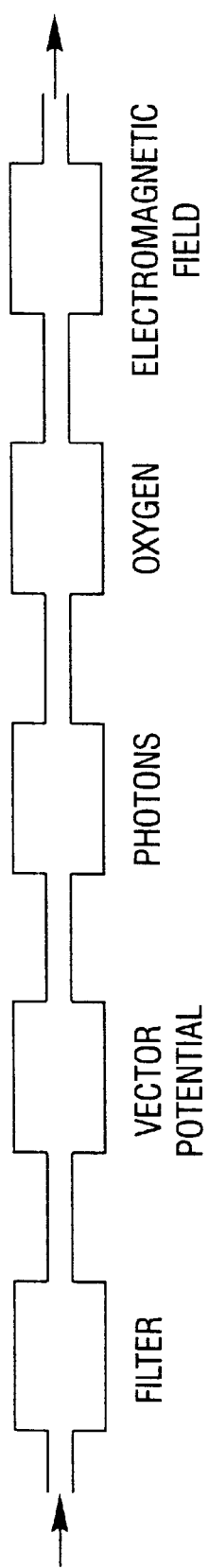
FIG. 1 is a block diagram of a particularly preferred embodiment according to the invention.
Figure 2:
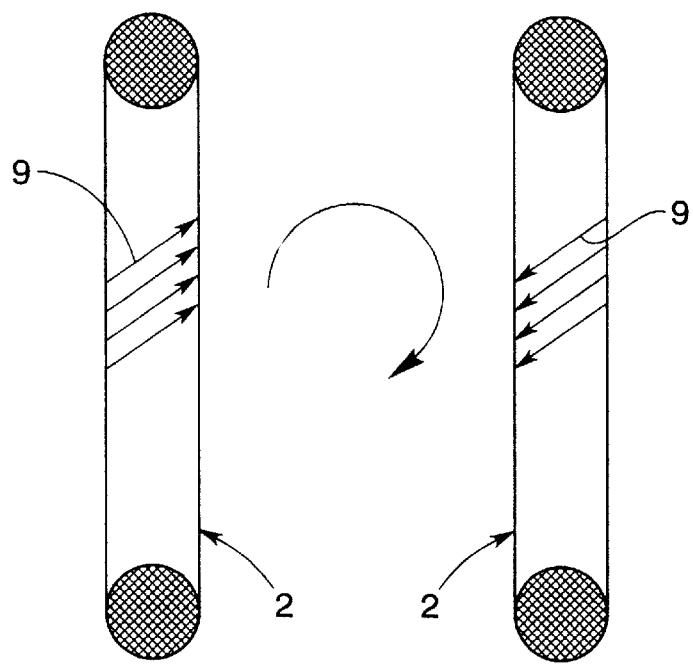
FIG. 2 shows two toroids (toroidal coils) for generating a vector potential without a magnetic field.
Figure 3:
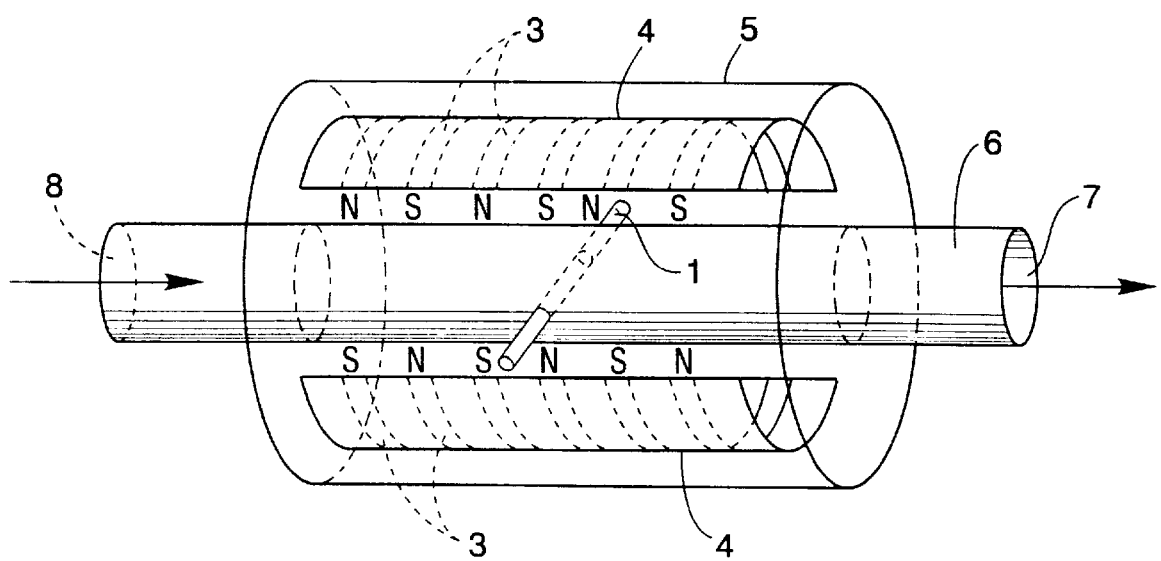
FIG. 3 shows a set-up with magnet elements generating a vector potential without a magnetic field.

Referring again to FIG. 1, the water is then treated with photons and then supplied with oxygen in an ionized or ozonized form. At last, the water is exposed to an electromagnetic field aligning the water molecules such that the oxygen is stably and permanently integrated into the molecular structure. Finally, the water exits the apparatus according to the invention shown in the block diagram.

I claim:

1. A method of increasing the oxygen content of a liquid, said method comprising:
   irradiating said liquid with photons of at least one wavelength;
   generating a vector potential without magnetic field or rotation;
   exposing said liquid to said vector potential; and
   introducing oxygen into said liquid.

2. The method of claim 1, wherein said liquid comprises aqueous liquid.

3. The method of claim 1, wherein said liquid comprises water.

4. The method of claim 1, wherein said liquid comprises drinking water.

5. The method of claim 1, wherein said liquid comprises nutrient oil.

6. The method of claim 1, wherein said liquid comprises liquid fuel.

7. The method according to claim 1 further including introducing $CO_2$ into said liquid.

8. The method according to claim 1, wherein said at least one wavelength is 333 nanometers.

9. The method according to claim 1, wherein said at least one wavelength is in the ultra violet region, thereby providing a germicidal effect.

10. The method according to claim 1, wherein said oxygen is ionized thereby providing a germicidal effect.

11. The method according to claim 1, wherein said oxygen is introduced by hydrogen peroxide.

12. The method according to claim 1 further including applying an electromagnetic field to said liquid which aligns the molecules of said liquid such that said molecules can stably bind said oxygen.

13. The method according to claim 1 further including supplying oscillatory information to said liquid exposed to said vector potential.

14. The method according to claim 13, wherein said oscillatory information is supplied by at least one laser beam modulated with at least one frequency.

15. The method according to claim 13, wherein said oscillatory information is supplied by electromagnetic waves emitted from at least one antenna.

16. The method according to claim 13, wherein said oscillatory information is supplied by acoustic waves produced by at least one loudspeaker capable of radiating at least one frequency.

17. The method according to claim 13, wherein said oscillatory information is supplied by mechanical oscillations produced by at least one piezoelectric oscillation device located in said liquid.

18. The method according to claim 13, wherein said oscillatory information is provided by more than one oscillation source emitting phase shifted signals of the same frequency, whereby the individual said phase shifted signals are in the range of 0° to 180°.

19. The method according to claim 1 further including filtering said liquid.

20. The method according to claim 19, wherein said filtering is accomplished by an active carbon filter.

21. The method according to claim 20, wherein said active carbon filter comprises activated carbon filaments.

22. The method according to claim 21, wherein said carbon filaments form a web or a knit fabric.

23. The method according to claim 22, wherein said web or knit fabric contains silver filaments having a germ reducing effect.

24. An apparatus for increasing the oxygen content of a liquid, said apparatus comprising:
   a liquid inlet;
   a liquid outlet;
   means for introducing oxygen into said liquid;
   means for generating a vector potential without a magnetic field or rotation; and
   a photon source capable of irradiating said liquid with photons of at least one wavelength
   wherein said photon source is located in the direction of liquid flow upstream of or at the location where oxygen is introduced.

25. The apparatus according to claim 24 further including a means for introducing $CO_2$.

26. The apparatus according to claim 24, wherein said photon source irradiates said liquid with photons having a wavelength of 333 nm.

27. The apparatus according to claim 24, wherein said photon source irradiates said liquid with photons having a wavelength in the ultraviolet region.

28. The apparatus according to claim 24, wherein said means for introducing oxygen introduces ionized oxygen into said liquid.

29. The apparatus according to claim 24, wherein said means for introducing oxygen introduces ozonized oxygen into said liquid.

30. The apparatus according to claim 24, wherein said means for introducing oxygen introduces hydrogen peroxide into said liquid.

31. The apparatus according to claim 24, wherein said means for generating a vector potential is located in the direction of liquid flow downstream of the introduction of oxygen into said liquid.

32. The apparatus according to claim 24, wherein said means for generating a vector potential comprises at least one magnet.

33. The apparatus according to claim 24, wherein said means for generating a vector potential comprises at least one toroid (toroidal coil) located adjacent the flow of liquid.

34. The apparatus according to claim 33, wherein the current flow in said toroid is directed such that a left-handed chirality is induced in said liquid, thereby further improving the biological properties of said liquid.

35. The apparatus according to 24, wherein said means for generating a vector potential comprises a plurality of magnet elements located adjacent the flow of liquid, such that the south and north poles of adjacent magnet elements abut each other.

36. The apparatus according to claim 24 further including at least one modulatable laser having a beam capable of penetrating said liquid.

37. The apparatus according to claim 24 further including at least one antenna capable of emitting electromagnetic radiation to penetrate said liquid.

38. The apparatus according to claim 24 further including at least one loudspeaker capable of producing sound radiation to penetrate said liquid.

39. The apparatus according to claim 24 further including at least one piezoelectric oscillation transducer capable of causing mechanical oscillations in said liquid.

40. The apparatus according to claim 24 further including a filter in the flow of said liquid.

41. The apparatus according to claim 40, wherein said filter comprises an active carbon filter.

42. The apparatus according to claim 41, wherein said active carbon filter comprises activated carbon filaments.

43. The apparatus according to claim 42, wherein said carbon filaments form a web or a knit fabric.

44. The apparatus according to claim 43, wherein said web or knit fabric contains silver filaments.

45. The apparatus of claim 24, wherein said liquid comprises aqueous liquid.

46. The apparatus of claim 24, wherein said liquid comprises water.

47. The apparatus of claim 24, wherein said liquid comprises drinking water.

48. The apparatus of claim 24, wherein said liquid comprises nutrient oil.

49. The apparatus of claim 24, wherein said liquid comprises liquid fuel.

* * * * *